United States Patent
Moir et al.

(10) Patent No.: US 8,214,833 B2
(45) Date of Patent: Jul. 3, 2012

(54) SYSTEMS AND METHODS FOR SUPPORTING SOFTWARE TRANSACTIONAL MEMORY USING INCONSISTENCY-AWARE COMPILERS AND LIBRARIES

(75) Inventors: Mark S. Moir, Windham, NH (US); Daniel S. Nussbaum, Cambridge, MA (US)

(73) Assignee: Oracle America, Inc., Redwood City, CA (US)

( * ) Notice: Subject to any disclaimer, the term of this patent is extended or adjusted under 35 U.S.C. 154(b) by 937 days.

(21) Appl. No.: 12/242,551

(22) Filed: Sep. 30, 2008

(65) Prior Publication Data

US 2009/0282410 A1 Nov. 12, 2009

Related U.S. Application Data

(60) Provisional application No. 61/052,536, filed on May 12, 2008.

(51) Int. Cl.
*G06F 12/00* (2006.01)
*G06F 13/00* (2006.01)

(52) U.S. Cl. ........................ 718/101; 718/106
(58) Field of Classification Search ................ None
See application file for complete search history.

(56) References Cited

U.S. PATENT DOCUMENTS

| | | | |
|---|---|---|---|
| 5,428,761 A * | 6/1995 | Herlihy et al. | 711/130 |
| 7,296,183 B2 * | 11/2007 | Cabrera et al. | 714/21 |
| 7,516,366 B2 * | 4/2009 | Lev et al. | 714/38.13 |
| 2007/0055960 A1 | 3/2007 | Damron et al. | |
| 2007/0156780 A1 * | 7/2007 | Saha et al. | 707/202 |
| 2007/0169030 A1 | 7/2007 | Tarditi et al. | |

OTHER PUBLICATIONS

Adve, Sarita V., etal., Shared Memory Consistency Models: A Tutorial, 1996, IEEE pp. 66-76.*
Bratin Saha, Ali-Reza Adl-Tabatabai, Quinn Jacobson: Architectural Support for Software Transactional Memory. International Symposium on Microarchitecture, 2006. pp. 185-196.
Pascal Felber, Christof Fetzer, Ulrich Müller, Torvald Riegel, Martin Süßkraut, and Heiko Sturzrehm. Transactifying applications using an open compiler framework. In TRANSACT, Aug. 2007, 8 pages.

(Continued)

*Primary Examiner* — Eric Coleman
(74) *Attorney, Agent, or Firm* — Robert C. Kowert; Meyertons, Hood, Kivlin, Kowert & Goetzel, P.C.

(57) ABSTRACT

Systems and methods may reduce overhead associated with read set consistency validation in software transactional memory implementations. These systems and methods may employ an inconsistency-aware compiler-library technique, in which an inconsistency-aware compiler communicates to various inconsistency-aware library functions knowledge about whether a given transaction has read consistent values to date. The inconsistency-aware library functions may exploit this information to avoid the need to validate the transaction, or portions thereof. If read set values are known to be consistent prior to the function call, the compiler may pass a parameter value to the function indicating as much. Otherwise, it may pass a value indicating that the read set values may be inconsistent. An inconsistency-aware function may determine that it will not perform a dangerous action, even though its parameters may not be consistent. Otherwise, the inconsistency-aware function may invoke a validation operation, or may perform other error avoidance operations.

20 Claims, 5 Drawing Sheets

OTHER PUBLICATIONS

Ali-Reza Adl-Tabatabai and Brian T. Lewis and Vijay Menon and Brian R. Murphy and Bratin Saha and Tatiana Shpeisman (Jun. 2006). Compiler and Runtime Support for Efficient Software Transactional Memory. In: Proceedings of the 2006 Conference on Programming language design and implementation. pp. 26-37.

Cheng Wang, Wei-Yu Chen, Youfeng Wu, Bratin Saha, and Ali-Reza Adl-Tabatabai. 2007. Code Generation and Optimization for Transactional Memory Constructs in an Unmanaged Language. In Proceedings of the International Symposium on Code Generation and Optimization (CGO '07). IEEE Computer Society, Washington, DC, USA, pp. 34-48.

Language Support and Compiler Optimizations for STM and Transactional Boosting. Guy Eddon and Maurice Herlihy. Proceedings of the 4th international conference on Distributed computing and internet technology ICDCIT'07, (2007).

* cited by examiner

SYSTEMS AND METHODS FOR SUPPORTING SOFTWARE TRANSACTIONAL MEMORY USING INCONSISTENCY-AWARE COMPILERS AND LIBRARIES

This application claims benefit of priority of U.S. Provisional Application Ser. No. 61/052,536 entitled "Systems and Methods for Supporting Software Transactional Memory Using Inconsistency-Aware Compilers and Libraries," filed May 12, 2008, the content of which is incorporated by reference herein in its entirety.

BACKGROUND OF THE INVENTION

1. Field of the Invention

This invention relates generally to concurrent access to shared objects, and more particularly to a system and method for implementing software transactional memory techniques for accessing shared objects.

2. Description of the Related Art

The multi-core revolution currently in progress is making it increasingly important for applications to exploit concurrent execution in order to take advantage of advances in technology. In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads. Typical concurrent programming practices, such as those based on locks and condition variables, are inadequate for this task. Locks do not compose, and introduce troublesome tradeoffs between complexity, performance, and scalability. Furthermore, locks are subject to deadlock if not used carefully.

Transactional memory is a paradigm that allows the programmer to design code as if multiple locations can be accessed and/or modified in a single atomic step. As typically defined, a transactional memory interface allows a programmer to designate certain sequences of operations as "atomic blocks" and "transactions," which are guaranteed by the transactional memory implementation to either take effect atomically and in their entirety (in which case they are said to succeed), or have no externally visible effect (in which case they are said to fail). Thus, with transactional memory, it may be possible in many cases to complete multiple operations with no possibility of another thread observing partial results, even without holding any locks, or without the programmer needing to determine what locks should be held, the order in which they are acquired, etc. The transactional memory paradigm can significantly simplify the design of concurrent programs.

Transactional Memory (TM) allows programmers to use transactional or atomic blocks, which may be considered sequential code blocks that should be executed atomically. In other words, executions of atomic blocks by different threads do not appear to be interleaved. To execute an atomic block, the underlying system may begin a transaction, execute the atomic block's memory accesses using that transaction, and then try to commit the transaction (i.e., to attempt to copy back results of the transaction to shared memory). If the transaction commits successfully, the atomic block's execution seems to take effect atomically at the transaction's commit point. If it fails, the execution does not seem to take effect at all and the atomic block might be retried using a new transaction. It is the responsibility of the TM implementation to guarantee the atomicity of operations executed by transactions.

Transactional memory is widely recognized as a promising paradigm for allowing a programmer to make updates to multiple locations in a manner that is apparently atomic, while addressing many of the problems associated with the use of locks. In general, transactional memory can be implemented in hardware (HTM), with the hardware directly ensuring that a transaction is atomic, or in software (STM) that provides the "illusion" that the transaction is atomic, even though in fact it is executed in smaller atomic steps by the underlying hardware. While HTM solutions are generally faster than STM ones, so-called "best-effort" HTM implementations may not be guaranteed to be able commit any particular transaction, in which case a programmer cannot rely solely on HTM, even if it is almost always effective.

SUMMARY

Transactional memory (TM) may support code sections that are to be executed atomically, i.e., so that they appear to be executed one at a time, with no interleaving between the steps of one transaction and another. This may allow programmers to write code that accesses and/or modifies multiple memory locations in a single atomic step, significantly reducing the difficulty of writing correct concurrent programs. In some embodiments, the systems and methods described herein may reduce the overhead associated with validation of the consistency of the read set of such transactions. The techniques may provide better performance than a typical STM implementation by avoiding expensive validation while also avoiding dangerous behavior based on mutually inconsistent read values.

The system and methods described herein employ an inconsistency-aware compiler-library technique, in which an inconsistency-aware compiler communicates to the library knowledge (or lack thereof) about whether a transaction has read consistent values to date. STM library functions that are configured to utilize read set consistency information passed to them, or otherwise made available to them, may be referred to herein as "inconsistency-aware functions." In some embodiments, if the read set values of an atomic transaction are known to be mutually consistent prior to a call to an inconsistency-aware function, the compiler may pass a parameter value to the function indicating as much. For example, if the compiler is able to determine that, in all cases, the read set values up to that point are guaranteed to be mutually consistent, it may include a call to the inconsistency-aware function and may set a consistency parameter value to "true" in the function call. Otherwise, the compiler may pass a parameter value indicating that the read set values are (or may be) mutually inconsistent (e.g., by setting a consistency parameter value to "false").

An inconsistency-aware function in the library may in some embodiments, and under certain circumstances, exploit the information provided by the compiler through the consistency parameter to avoid the need to validate the transaction, or particular operations thereof. For example, an inconsistency-aware function may be configured to execute the body of the function (i.e., the basic functionality intended to provided by the function, such as an arithmetic or logical operation, a transactional load and any associated bookkeeping or coordination operations, etc.) without performing a read set consistency validation operation if a consistency parameter value passed to the function indicates that read set values were known to be mutually consistent at the time the function was called. Note that executing the body of the function may in some embodiments involve executing code in one of two or more alternate execution paths included in the function (e.g., dependent on the value of a consistency parameter or input parameter, or on other considerations), as described in more detail herein.

On the other hand, if a consistency parameter value passed to an inconsistency-aware function indicates that the read set values were not known to be mutually consistent at the point at which the function was called, the function may take one of several other actions. In some embodiments, the inconsistency-aware function may be configured to determine whether it might perform a dangerous action if its inputs (i.e., inputs to the function that are part of the read set of the transaction) are not mutually consistent, or that it is safe to execute the body of the inconsistency-aware function, even though the read set values may not be consistent. In some embodiments, if it is not safe to execute the body of the inconsistency-aware function in the case that its parameters are mutually inconsistent, the function may resort to invoking an expensive validation operation. In other cases this may not be necessary (e.g., in the case that it can be determined that an operation using inconsistent read set values is not semantically illegal or otherwise undesirable).

In the case that a read set consistency validation operation is invoked and successfully validates that the read set values are mutually consistent, the function may communicate an indication of the validation to additional code generated by the compiler that is to be executed following execution of the inconsistency-aware function. In this way, the additional code (which may include another call to an inconsistency-aware function) may take advantage of the knowledge that consistency of the reads to date has been validated. In other embodiments, an inconsistency-aware function may return without executing the body of the inconsistency-aware function or may perform other error avoidance operations in the case that it is not safe to execute the body of the inconsistency-aware function when its parameters mutually inconsistent.

Figure 1:
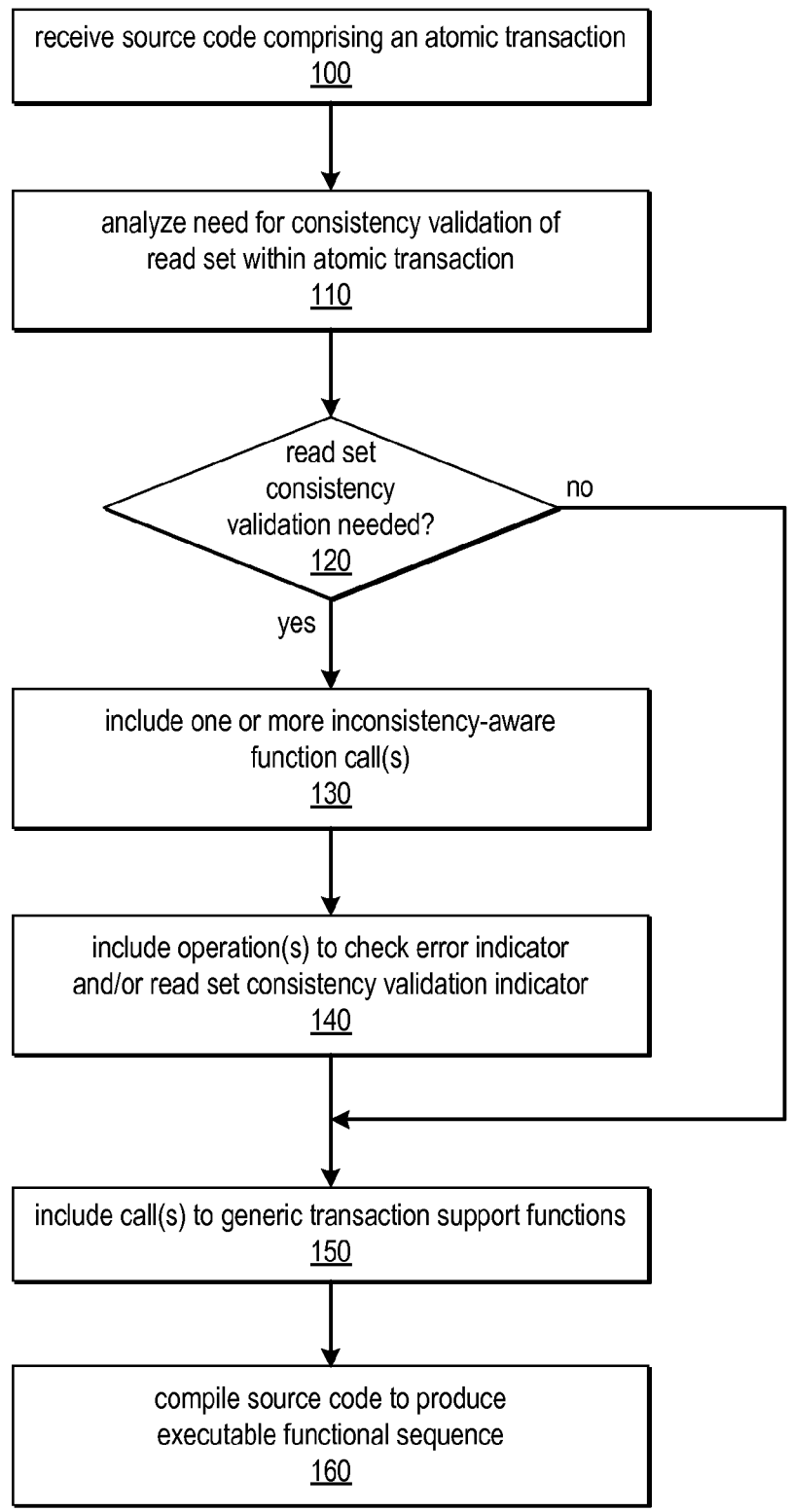
FIG. 1 is a flow diagram illustrating one embodiment of a method for preparing and compiling code using an inconsistency-aware compiler and library interface, as described herein.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Transactional memory is widely considered to be the most promising avenue for addressing issues encountered in concurrent programming and execution. Using transactional memory, programmers may specify what should be done atomically, rather than how this atomicity should be achieved. The transactional memory implementation may then be responsible for guaranteeing the atomicity, largely relieving programmers of the above-mentioned complexity, tradeoffs, and software engineering problems typically associated with concurrent programming and execution. As noted above, transactional memory may be implemented in hardware, in software, or in a combination of the two, in various embodiments. Hardware transactional memory (HTM) designs may be characterized as unbounded, bounded, or "best-effort" implementations. For example, a bounded HTM may include a fixed-size, fully associative transactional cache, and a transaction may be committed if and only if it fits in that cache. Alternative "best-effort" designs may piggyback on existing caches and other hardware structures such as store buffers, and therefore may be able to commit one large transaction while being unable to commit another significantly smaller one, depending on how the transactions happen to map to the existing structures. Such best-effort HTMs may not be required to make particular guarantees about what transactions can commit, and may therefore be substantially easier to design, because difficult corner cases may be handled by simply aborting a transaction.

If used directly, both bounded and best-effort HTM designs may impose unreasonable constraints on programmers because programmers may need to take into account the number or distribution of cache lines accessed by a transaction. Furthermore, the details of such constraints may vary from one machine to another, so programs that must respect those constraints may not be portable. Recently, proposals for "unbounded" HTM have appeared in the literature in an effort to overcome the shortcomings of bounded and best-effort HTM designs. Unfortunately, however, these designs typically entail substantially more complexity than the much simpler best-effort implementations, making them difficult to integrate into commercial processors.

Software transactional memory (STM) implementations, in which the transactional memory is implemented entirely in software without special hardware support, may provide software engineering benefits similar to those provided by HTM. In STM implementations, coordination between conflicting concurrent transactions is mediated using software. Therefore, STM implementations may be built and used in existing systems without hardware modification. Because STM is independent of hardware structures such as caches and store buffers, STM implementations may not be subject to the limitations of bounded and best-effort HTMs described above. However, STM implementations are typically one to two orders of magnitude slower than what can be expected from HTM, and a substantial gap between HTM and STM is likely to remain.

As noted above, software transactional memory implementations may provide programmers with the ability to specify a region of code as "atomic". When a region of code is so designated, it should appear as if the section is executed in its entirety or not at all, and it should appear as if the executions of concurrently executing atomic blocks are not interleaved with each other. This capability may dramatically simplify the construction of concurrent programs that are correct, efficient, and scalable, because it relieves programmers of the need to explicitly embed synchronization mechanisms into their application code (for example using mutual exclusion locks to explicitly prevent the concurrent execution of different "critical sections" of code).

Typical STM implementations execute atomic blocks of code as "optimistic" transactions, meaning that, rather than preventing concurrent execution, they proceed with the hope that no interference occurs, and have the capability to confirm that this is the case, rolling back the transaction and retrying it in case there is interference. An obvious implication is that, before a transaction "commits" (i.e., takes effect), it must ensure that none of the values it has read during execution have since changed (or at least that at some point during the commit, all those locations have the same values that were read during execution). In other words, the implementation must ensure that the reads performed by the transaction are "mutually consistent", i.e., that the values read could have been read in the absence of concurrent execution by other transactions. If this requirement is not met, transactions do not appear to be atomic, and the STM implementation is incorrect. Various researchers have proposed a variety of "validation" techniques (by which STMs can determine if the values read to date are consistent), and other techniques that ensure that they cannot become inconsistent. There are significant tradeoffs between correctness, performance, scalability, complexity, and interactions with these mechanisms and requirements. Dealing with this problem may be one of the most troublesome aspects of STM design. Mechanisms for determining that the set of values read by a transaction (which may be referred to herein as its "read set") is mutually consistent are called "validation" mechanisms, and may be referred to herein in various passages as validation mechanisms, validation operations, read set consistency validation operations, etc.

The system and methods described herein are consistent with a belief that, despite recent improvements in the overhead of validation, it may be better to avoid validation altogether, where this is possible without compromising correctness. Avoiding unnecessary validation may reduce the execution overhead for each thread, and may also reduce contention for resources accessed by those validation operations that are necessary for correctness.

In some embodiments, software transactional memory systems may be carefully designed to avoid dangerous behavior in case the set of values read by a transaction is inconsistent (i.e., if it could never have existed together in memory at the same point in time if all transactions were atomic). Although a transaction that has not read consistent values may not (or should not) successfully commit, user code executed based on inconsistent values may in general behave arbitrarily.

In addition to confirming at commit time that the values it has read are mutually consistent, an STM implementation may also address the possibility that the set of values read (so far) by a currently executing transaction are inconsistent at any given point. In other words, even if it is guaranteed that the transaction will not commit successfully in this case, the STM implementation may, in some embodiments, ensure that the transaction does not do anything dangerous in the meantime.

It is easy to construct examples in which incorrect behavior can result from a transaction reading inconsistent values. Consider the following simple transactional program.

```
int X=0, Y=1;
thread 1:
    while (1) {
        X++;
        Y++;
    }
}
thread 2:
    float z = 0;
    while (1) {
        z += 1/(Y-X);
    }
}
```

It is easy to see that X !=Y is an invariant of this program, so it should not do anything wrong (it will also not do anything useful, of course, but that is not the point). However, if thread 2 could read values from X and Y that are not consistent, it is possible that it would read, for example, X=1 and then Y=1. Even though the transaction will not commit, when thread 1 performs its division in this case, it will attempt to perform a divide-by-zero, resulting in an error that is not possible according to the semantics of the program.

This is just one simple example of what could go wrong if a thread sees inconsistent values from its reads. In fact, at least in some contexts, arbitrary behavior is possible. For example, some correct (if not entirely elegant) code might do something like computing a pointer into an array of functions and then calling the function at the computed pointer. If the computation were based on inconsistent values, the pointer could point outside this array, perhaps into some data. In this case, treating data at that address as code and executing it may be completely unpredictable. Therefore, in some embodiments, the STM implement may be configured to either prevent the execution of user code that has read inconsistent values, or to be sure that all ill effects of execution based on inconsistent reads can be "contained".

In some contexts, particularly in managed runtime environments, such as a Java™ environment, it may be possible to contain ill effects of an inconsistent transaction, because such environments may be required to contain the effects even of malicious code. For example, if something bad happens, an exception may be raised. In response, the transaction may be validated (i.e., its read set values may be evaluated for consistency). If it validates successfully, then the program really did this bad thing, so the usual error for that bad thing may be reported. If not, the transaction may be transparently rolled back and retried. Even so, in such environments, care may be taken to avoid particular types of bad behavior, such as executing an infinite loop based on inconsistent reads. This may be achieved, for example, by validating on each back edge, so that infinite execution without validating is not possible.

It has been proposed by some researchers that validation be performed "occasionally" to reduce the overhead of validation, and that validation be performed on each back edge to avoid infinite loops "and other errors". However, in some contexts it may not be possible or desirable to contain all bad behavior. For example, in unmanaged languages such as C and C++, bad behavior can occur even in straight-line code (as in the example above). Thus, validating occasionally and on back edges may not be sufficient to prevent bad behavior. The system and methods described herein may allow some validations to be elided in such contexts without compromising correctness. Therefore, the systems and methods described herein may reduce the overhead associated with validation, which is one of the primary sources of overhead in existing STM implementations.

The system and methods described herein may employ a compiler-library technique, in which the compiler communicates to a library function knowledge (or lack thereof) about whether the transaction has read consistent values to date, and the library function may exploit this information to avoid the need to validate the transaction, in some cases. For example, the library function may determine that it will not perform a dangerous action, even though its parameters may not be consistent. In some cases, the library function may have to resort to an expensive validation call. In such cases, the function may be configured to communicate this fact back to the code generated by the compiler to be executed after the library function, so that this code can again take advantage of the knowledge that consistency of the reads to date has been validated. In general, the system and methods described herein may use compiler optimization techniques in cooperation with an STM library to significantly reduce how often validation must be performed, as well as to reduce its cost.

In one embodiment, the compiler may be configured to include read set consistency validation only when something bad might happen if the reads performed so far are not consistent. For example, many instructions will not cause bad behavior, even if the reads performed so far are not consistent. In the example above, the divide might cause a divide by zero error if the reads are inconsistent, but if the division operation were replaced by an addition operation, no bad behavior would be possible even if the operands were wrong. Thus, validation may not need to be performed immediately after each read, as is done by most correct STMs for unmanaged languages at present. Instead, validation may be delayed until some instruction will be executed that the compiler cannot prove is safe if the reads so far are inconsistent. In addition to validating before executing an instruction that might directly cause bad behavior, in some embodiments, the STM implement may perform read set consistency validation before transferring control beyond the scope of the current compiler analysis (e.g., before returning from a function).

An STM implementation that merely includes read set consistency validation only when something bad might happen if the reads performed so far are not consistent may not provide significant benefit in its own right. The reason is that it may not be safe to perform another read without validating first, because of the possibility that the address for the read has been calculated based on inconsistent values read previously. This could result in a segmentation violation, for example, if the computed address is 0. Therefore, the total number of validations saved may be at most one per transaction (e.g., this implementation may avoid the need to validate after the last read performed by the transaction, and before the commit).

In other embodiments, the STM implementation may be configured not to validate before a read if its address is known to be valid despite the values read so far potentially being inconsistent. This is illustrated by way of the following example pseudo-code segment:

```
int X, Y, Z;
read X;
read Y;
read Z;
```

In this example, there may be no need to validate after the reads of X and Y, because the addresses of Y and Z are known to be valid addresses, even if the values read from X and Y are mutually inconsistent. In some embodiments, these read operations may be performed by calling an inconsistency-aware function, as described herein. In this example, validation after the reads of X and Y may be elided by providing an indication to the inconsistency-aware functions reading Y and Z that the read set is consistent, even if this is not known to be true. In other words, an inconsistency-aware compiler may be configured to determine that it is safe not to validate the read set following the reads of X and Y for this code sequence, and may pass an indication to an inconsistency-aware function to that effect.

In general, it may be safe for a compiler to delay read set consistency validation until after any sequence of instructions that it can prove are safe to execute, even if their operands are inconsistent, and the STM implementation may be configured to do so. This may apply to most kinds of instructions, such as arithmetic instructions (not including divide), logical instructions, etc. In some embodiments, the compiler may be configured to determine whether it is safe to delay validation based on knowledge about functions (e.g., that it is safe to call a simple math function, even though one or more operands may be wrong). In some embodiments, the compiler may be configured to take care regarding control flow implications. For example, an infinite loop might occur if the exit condition for the loop is based on inconsistent data. This case may be eliminated, in some embodiments, by validating on every backwards branch or back edge in the control flow graph (or perhaps every $n^{th}$ one, for some n), for example.

As noted above, in some cases it may be safe to call a function with arguments based on inconsistent values read previously. In other cases it may not be, and validation must be performed before calling the function. There may also exist an interesting and important class of functions in which "it depends", and the compiler cannot know whether a particular instance of a function call is safe or not. In general, the compiler may therefore conservatively validate before calling such functions, thereby incurring the overhead of validation for every call, even though this may be necessary only a small fraction of the time.

The system and methods described herein may in some embodiments include a method for designing inconsistency-aware libraries and a compiler-library interface. The compiler-library interface may in some embodiment allow the compiler to communicate to the library so that the library can decide whether validation is necessary, and in some cases to choose between alternative validation methods based on knowledge about the domain, the values passed to the function, etc. While persons skilled in the art will appreciate wider applicability, the compiler-library interface is described herein using the following concrete example.

The following pseudo-code represents an excerpt from a simple, generic compiler-library interface of a software transactional memory implementation that does not include an inconsistency-aware library or corresponding compiler-library interface:

```
UINT8 HyTMCompilerIf_TranRead8 (void* theTranId,
UINT8 * theAddr);
UINT16 HyTMCompilerIf_TranRead16(void* theTranId,
UINT16* theAddr);
UINT32 HyTMCompilerIf_TranRead32(void* theTranId,
UINT32* theAddr);
```

-continued

```
UINT64 HyTMCompilerIf_TranRead64(void* theTranId,
    UINT64* theAddr);
```

Using this simple interface, for a transactional read, the compiler generates a call to the appropriate one of the above functions. In this example, the compiler also generates a call to another library function to validate the current transaction after each such read, to ensure read set consistency.

The pseudo-code below may represent an excerpt from a more sophisticated compiler-library interface in an STM implementation that includes an inconsistency-aware library:

```
RdHandle* HyTMCompilerIf_AcquireReadPermission( void* theTranId,
    void* theAddr, bool theValid);
UINT8 HyTMCompilerIf_TranRead8 (void* theTranId,
    RdHandle* theRdHandle, UINT8 * theAddr, bool theValid);
UINT16 HyTMCompilerIf_TranRead16(void* theTranId,
    RdHandle* theRdHandle, UINT16* theAddr, bool theValid);
UINT32 HyTMCompilerIf_TranRead32(void* theTranId,
    RdHandle* theRdHandle, UINT32* theAddr, bool theValid);
UINT64 HyTMCompilerIf_TranRead64(void* theTranId,
    RdHandle* theRdHandle, UINT64* theAddr, bool theValid);
```

Note two differences between the simpler interface shown above and the more sophisticated one. First, the functionality of the library functions is re-factored, so that before generating a call representing the first access to a particular location, the compiler generates a call to a permission acquisition function. In this example, the permission acquisition function returns an opaque handle that may be passed to subsequent reads to that location. This technique, together with standard inlining of common sub-expressions and other compiler optimization techniques, may allow the STM implementation to avoid recalculating similar values multiple times.

The second difference between the simple and sophisticated interfaces involves the use of the "theValid" parameter. In some embodiments, this parameter may be used by the compiler to indicate whether or not the set of values read by the transaction to date is known to be mutually consistent. For example, in cases where the compiler can prove that the set of values read by the transaction to date is consistent (perhaps because there is a successful call to the STM's validation function on the code path to this call), the compiler may generate a function call with the "theValid" parameter set to true. Otherwise, if there is some chance that the reads so far are not consistent, the compiler may generate a function call with the "theValid" parameter set to false. In such embodiments, the STM library functions (e.g., those mentioned above) may be configured to exploit this information. For example, if "theValid" is true, no special action may be required beyond what a more generic STM system that always ensures consistent values (which is costly) would perform. However, if "theValid" is false, various inconsistency-aware functions library functions may use different techniques to avoid dangerous behavior.

In some embodiments, an inconsistency-aware function may simply call the STM's read set consistency validation function before proceeding with the normal, generic code (and the body of the function), thereby ensuring it is safe to do so (but incurring the cost of the validation). However, a variety of other alternatives will be appreciated by persons skilled in the art. For one example, in one embodiment, a simple address range check may determine that an address being loaded is on the transaction's stack, and therefore is safe to read, even if the address has been determined based on inconsistent reads. In such cases the transaction will ultimately abort (e.g., either next time it calls the STM's validation function during the execution of the transaction, or when it attempts to commit the transaction and fails).

In cases in which "theValid" is false, and the STM read function does not validate the transaction, the read function may return an inconsistent value. However, this may be safe because the compiler knows that the values read until this point may not be consistent. Thus, the compiler may continue generating calls with the "theValid" parameter value set to false until the transaction aborts, validates, commits, or otherwise determines that it is again safe to assume that the reads performed by the transaction to date are consistent. Persons skilled in the art will recognize additional optimization opportunities by further extending the interface. For example, in one embodiment, if the STM read function calls the STM's validation function, and this is successful, the read function may communicate to the subsequent code that the values read so far are again known to be consistent. This may be achieved, for example, by storing an indication in a known register (e.g., a consistency indicator) that a validation attempt occurred and was successful. In such embodiments, the compiler may generate code to check this register after the function call, so that subsequent calls generated on this code path by the compiler will pass true for the "theValid" parameter value.

Inconsistency-aware compilers and methods, such as those described above, may be applied in a wide variety of contexts, and a variety of techniques may be used to avoid the high cost of validation. This is further illustrated by way of a second example. In this example, a TM library may provide a function to compute the logarithm of a double-precision floating-point number, as in the pseudo-code below.

```
double TM-log (double x) {
    return log(x);
}
```

In this example, if the value of x is zero or negative, calling this function may produce an error. If x has been computed based on inconsistent previously read values, this may occur in a correct program (i.e., one that always ensures it passes correct parameter values to TM-log provided the values read to date are consistent). Therefore, most correct prior-art implementations will require validation, and the associated expense, before calling the TM-log function.

An inconsistency-aware version of this function, however, may avoid this cost in the common case, as illustrated by the pseudo-code below.

```
double IA-log (double x, theValid) {
    if (theValid || x>0 || ValidateTransaction( )) {
        return log(x);
    }
    return 42.0;
}
```

This function calls log(x) directly if "theValid" is true (indicating that x has been computed based on consistent reads). However, if "theValid" is false, the function does not immediately resort to the expense of calling the STM's validation function (called ValidateTransaction( ) here). Instead, the function checks the value of x to determine whether it is safe to call log(x) even though x may be invalid. In this example, if x is greater than 0, the functions calls log(x), just as if "theValid" were true. As before, x may be inconsistent, but the call to log(x) will not generate an error, because x is positive. In this example, the transaction may determine later that the read set is inconsistent and that it must abort. However, the expensive validation operation has been elided.

In this example, if the value of x is an illegal argument for the log function (i.e., if it is zero or negative), this may be either because the program is incorrect, in which case an error should be reported, or because the transaction has performed inconsistent reads. In the case that the value of x is illegal, the IA-log function may call ValidateTransaction( ) to validate the consistency of the read set (to date). If ValidateTransaction( ) returns "true," it means that x has been computed based on consistent reads, and therefore the user program has a bug. This bug manifests itself exactly as it should, because IA-log calls log(x) with the consistent but incorrect parameter value. On the other hand, if ValidateTransaction( ) returns "false," IA-log may simply return an arbitrary value (e.g., 42.0). In this example, this may not present an error to the user program, and may not cause other incorrect behavior. However, as before, the transaction may eventually determine that its reads are inconsistent and abort.

As described above, a programmer may write source code specifying that certain operations, functions, etc., should be executed atomically, as a transaction. Note that in some embodiments, the operations may not actually be executed atomically, but may appear to be executed atomically to other processes or threads also executing in the same system. When generating a compiled (or other executable) version of an application including the source code, an inconsistency-aware compiler may analyze the source code prior to compilation. Rather than directly compiling the transaction code written by the programmer, the inconsistency-aware compiler may generate code configured to implement inconsistency-aware functions, as described in detail herein. For example, if the source code includes an addition operation, the compiler may merely output the corresponding "add" instruction of the target processor's instruction set for this operation, since the compiler knows that the machine instruction "add" will execute safely (although maybe not correctly) if its arguments are based on inconsistent read set values. In another example, if the source code includes a divide operation, the compiler may in some embodiments output a validation operation to determine whether the arguments of the divide operation are known to be consistent, followed by the corresponding "divide" instruction of the target processor's instruction set. Since inconsistent values may result in an illegal operation (e.g., divide-by-zero), if the read set validation fails, the transaction may abort and/or be retried. In another embodiment, if the source code includes a divide operation, the compiler may output an executable sequence to test the arguments of the divide operation to see if they are legal (e.g., will not cause a divide-by-zero). The compiler may in some embodiments also output (on one path) a validation operation to determine whether a divide-by-zero condition detected by the test sequence was due to inconsistent read set values, or some other error condition. In these examples, (addition and division) the compiler would not include a call to an inconsistency-aware function in the executable sequence.

However, if the source code includes a call to a library function for which an inconsistency-aware version is available, the inconsistency-aware compiler may replace this call with a call to the inconsistency-aware version of the function, rather than outputting an explicit call to a validation operation for execution prior to the function call, where appropriate. For example, if the source code includes a transactional read operation, the inconsistency-aware compiler may output a call to a corresponding inconsistency-aware function to perform the transactional read (such as one of those described in the example above), and may pass the current value of the consistency parameter to the inconsistency-aware function. Similarly, if the source code includes a call to a function to compute the logarithm of a double-precision floating-point number, and an inconsistency-aware version of the function (such as that described above) is available in the library, the compiler may output a call to the inconsistency-aware version of the function, and may pass the current value of the consistency parameter to the function.

One embodiment of a method for generating and compiling code using an inconsistency-aware compiler and library interface is illustrated by the flow chart in FIG. 1. As illustrated in FIG. 1, an inconsistency-aware compiler may receive source code comprising an atomic transaction, as described herein. This is shown as 100 in FIG. 1. The compiler may be configured to analyze the need for validating the consistency of the transaction's read set values at different points in the code, as in 110. For example, as described above, the compiler may be configured to determine that there is a given point within the execution of the atomic transaction at which semantically illegal or otherwise unacceptable operations may occur if the read set values for accesses performed up to that point are not consistent. In another example, the compiler may be configured to determine that read set consistency need not be validated before a given read access if its address is known to be valid, despite the fact that the read set values for accesses performed up to that point are potentially inconsistent, as described above. In general, the compiler may be configured to determine when it is safe to delay validation of read set consistency and when it may be desirable to perform validation of read set consistency by determining if a sequence of instructions can be proven to be safe to execute, even if their operands are inconsistent, as described above.

If it is determined that read set consistency validation is needed, shown as the positive exit from 120, the compiler may include one or more calls to inconsistency-aware functions, as in 130. For example, the compiler may insert calls to one or more functions of an inconsistency-aware library, such as the function to acquire read permission described above. In another example, the compiler may replace one or more generic function calls with corresponding inconsistency-aware function calls from such a library (such as the inconsistency-aware transaction read functions described above). Note that, as described above, each of these function calls may include a parameter whose value indicates whether or not the read set values up to that point are known to be consistent or are potentially inconsistent. The value of the consistency parameter (e.g., the "theValid" parameter described herein) may be determined in part by the compiler when analyzing the source code, as in 110, so that it may be passed to the inconsistency-aware function during execution of the atomic transaction.

In some embodiments, the compiler may also insert an operation to check an error indicator and/or a read set consistency validation indicator following each call to an inconsistency-aware function, as in 140. For example, the compiler may insert an operation to read the value of a designated register or other shared location that may be modified by actions taken during execution of the inconsistency-aware function, as described in more detail below. In some embodiments, the compiler may include alternate code paths that may be executed following the return from the inconsistency-aware function, and the selection of one of these paths may be dependent on the value of such a register or shared location. For example, the compiler may include a call to an inconsistency-aware function with the consistency parameter set to "true" on one path, and may include a call to the same inconsistency-aware function, but with a consistency parameter value of "false," on an alternate path. At runtime, the value read from the designated register or shared location may determine which code path is executed.

In some cases, the compiler may insert one or more explicit calls to a validation function instead of, or in addition to, inserting one or more calls to inconsistency-aware functions. For example, the compiler may be configured to determine a trade-off between the cost of a read set consistency validation operation and a performance improvement that may result from the use of an inconsistency-aware function (e.g., dependent on the probability that a validation may need to be performed in many or most cases by the inconsistency-aware function). In another example, the compiler may be configured to insert one or more calls to generic transaction support functions (e.g., an operation configured to perform software-mediated conflict detection for read and write sets before commitment of the transaction), regardless of whether the compiler has also inserted one or more inconsistency-aware functions at other points in the code. This is illustrated in FIG. 1 as element 150.

In the example illustrated in FIG. 1, after the compiler inserts any calls to inconsistency-aware functions and/or generic transaction support functions, the compiler may produce an executable functional sequence configured to perform the atomic transaction and to perform read set consistency validation only when necessary, as in 160. For example, an inconsistency-aware function included in the functional sequence may or may not invoke a validation operation when the consistency parameter value is false, as described in more detail below. Note that in various embodiments, rather than modifying source code to generate modified source code that includes calls to inconsistency-aware functions, code transformations (e.g., to replace calls to standard functions with calls to inconsistency-aware functions) or insertion of inconsistency-aware function calls may be performed in other phases, such as in a transformation of an intermediate code representation, or during code generation.

If the compiler determines that the operations of the atomic transaction may be executed safely without validating the consistency of the read set (or that read set validation may only need to be performed once prior to committing the transaction), shown as the negative exit from 120, the source code may be compiled without including any inconsistency-aware functions. As illustrated in FIG. 1, in some embodiments, the compiler may still insert one or more calls to generic transaction support functions in the code (e.g., an STM conflict detection operation for the read and write sets of the transaction) even if no inconsistency-aware functions are inserted by the compiler.

Note that in another embodiment, the compiler may be configured to include inconsistency-aware functions even at points at which it has determined that read set consistency validation is not needed, and may set the consistency parameter value to true. For example, in some embodiments, a programmer may explicitly include calls to inconsistency-aware functions, rather than corresponding generic functions, and may rely on the compiler to determine if they are, in fact, necessary. If they are not necessary (e.g., if the compiler determines that, at a given point, the read set values are known to be mutually consistent up to that point), the compiler may set the value of the consistency parameter to true. Note also that in some embodiments, both inconsistency-aware functions and generic functions may be included in a single transaction support library, rather than in separate libraries.

Figure 2:
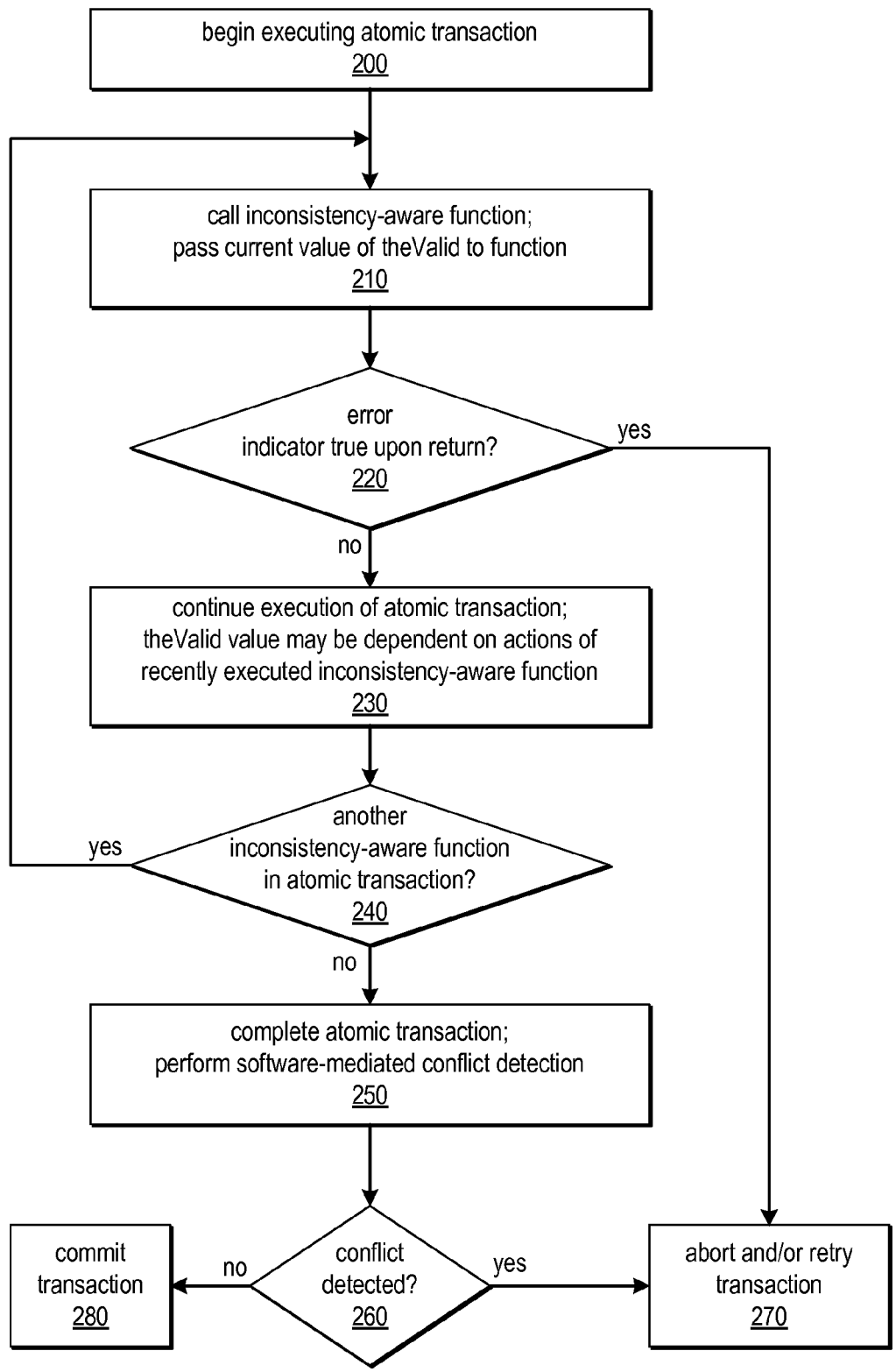
FIG. 2 is a flow diagram illustrating one embodiment of a method for executing atomic transactions comprising calls to inconsistency-aware functions.

The code generated and compiled by the inconsistency-aware compiler may be executed on a computing system (e.g., the same computing system on which is was compiled or a different system) and may perform various atomic transactions on a shared memory. FIG. 2 is a flowchart illustrating a method for executing one such atomic transaction, according to one embodiment. In this example, it is assumed that the generated code includes at least one call to an inconsistency-aware function. As shown at 200, the method may include beginning execution of the atomic transaction. During execution, an inconsistency-aware function (e.g., a first or only inconsistency-aware function within the generated code) is called, as in 210. As described above, when the inconsistency-aware function is called, the current value of a consistency parameter (e.g., "theValid") may be passed to the inconsistency-aware function. As described herein, the value of the consistency parameter may in various embodiments be set to "true" by the compiler in the case that the read set values of the transaction to date are known to be mutually consistent. Otherwise, the compiler may set the value of the consistency parameter to "false."

In the example illustrated in FIG. 2, when control returns to the execution of the atomic transaction (e.g., following a return from the inconsistency-aware function), an error indicator (e.g., a value returned by the function or a value stored in a designated register or other shared location) may be consulted, as in 220. In this example, if any action taken during execution of the inconsistency-aware function caused the error indicator to be set to "true," shown as the positive exit from 220, the transaction may be aborted and/or retried, as in 270.

If, on the other hand, the error indicator value is "false," shown as the negative exit from 220, execution of the atomic transaction may continue, as in 230. As illustrated in FIG. 2, the value of the consistency parameter at this point may be dependent, at least in part, on actions taken during execution of the inconsistency-aware function. For example, if the inconsistency-aware function invoked a read set validation operation and returned (or stored) an indication that the read set values to date were found to be mutually consistent, the consistency parameter value may be set to "true" even though it may have been "false" when the inconsistency-aware function was called. In the example illustrated in FIG. 2, if the atomic transaction includes another call to an inconsistency-aware function (e.g., a call to another inconsistency-aware function or a call to invoke another instance of the same inconsistency-aware function), this updated consistency parameter value may be passed to the function when it is called.

If there are additional calls to inconsistency-aware function(s) within the atomic transaction, shown as the positive exit from 240, the operations illustrated in 210-240 may be repeated for each of these inconsistency-aware functions, as applicable. If there are no more calls to inconsistency-aware functions, shown as the negative exit from 240, the remaining instructions of the atomic transaction may be executed to complete the atomic transaction, and software-mediated conflict detection may be employed to determine if the completed atomic transaction may be committed, as in 250. For example, if the atomic transaction involves a modification of shared memory, software code may be executable to verify that no other code, such as may be executing in another thread, is also executing instructions to modify the same location in shared memory. This conflict detection code may in various embodiments be included in the atomic transaction code itself, in the operating system, or in a function of a transaction support library called by the atomic transaction or operating system (e.g., a call to such a function may have been inserted by the compiler, as in 150 of FIG. 1).

If no conflicts are detected, shown as the negative exit from 260, the atomic transaction may be committed, as in 280. As discussed above, committing the transaction may cause all of the results of the execution of the transaction to be observable and to appear as if they were performed in a single atomic operation. If, on the other hand, conflicts are detected, shown as the positive exit from 260, the atomic transaction may be aborted and/or retried, as in 270.

Figure 3:
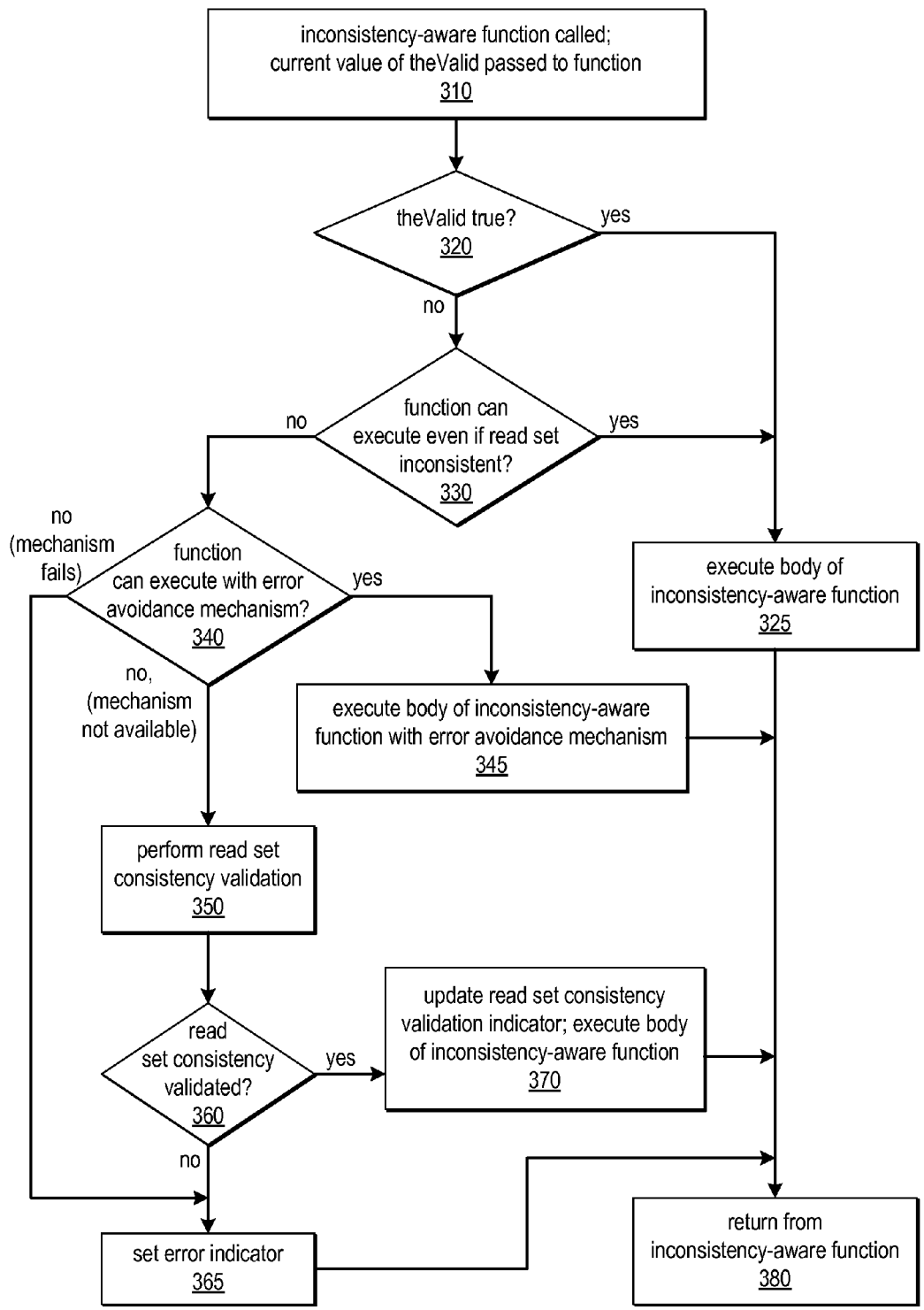
FIG. 3 is a flow diagram illustrating one embodiment of a method for executing an inconsistency-aware function.

As previously noted, an inconsistency-aware function may in some embodiments be configured to avoid performing an expensive read set consistency validation operation except under certain (preferably rare) circumstances. FIG. 3 illustrates a method for executing an inconsistency-aware function, according to one embodiment. In this example, an inconsistency-aware function (e.g., a first or only inconsistency-aware function within the code generated for an atomic transaction, as described above) is called, as in 310. As described above, when the inconsistency-aware function is called, the current value of a consistency parameter (e.g., "theValid") may be passed to the inconsistency-aware function as an input to the function.

If the consistency parameter value is "true", shown as the positive exit from 320, the body of the consistency-aware function may be executed without the need to validate the consistency of the read set of the atomic transaction to date, as in 325. For example, if the inconsistency-aware function is a transactional read operation, the read access may be performed, and a read value may be returned to the atomic transaction code, as in 380.

If, on the other hand, the consistency parameter value is "false", shown as the negative exit from 320, the inconsistency-aware function may perform any one of several actions, or may apply multiple techniques in resolving the function call. In the example illustrated in FIG. 3, the inconsistency-aware function may determine if it is safe to continue even though the read set values are not known to be consistent, as in 330. If it is determined that execution of the body of the function may be safely (though perhaps incorrectly) executed even if its parameters are mutually inconsistent (e.g., if no semantically illegal or otherwise undesirable operations are possible), the body of the inconsistency-aware function may be executed without the need to validate the consistency of the read set of the atomic transaction to date, as in 325, and control may return to the atomic transaction, as in 380.

In the example illustrated in FIG. 3, if it is determined that the function cannot be safely executed in at least some cases in which the read set values of the atomic transaction are mutually inconsistent, shown as the negative exit from 330, it may still be possible to execute the body of the inconsistency-aware function without validating the read set consistency, if the body of the inconsistency-aware function in conjunction with, or according to, an error avoidance mechanism. For example, in some cases, a simple check on the value of a calculated address, on the value of an input parameter, or on a boundary condition for the function may be performed to determine whether execution of the function is safe, given the particular input parameter values passed to the function. In another example, some architectures support non-faulting loads. In such architectures, loads may be performed to an invalid address without crashing the program. In embodiments that support such non-faulting loads, they may be used to avoid read set validation, because it does not matter whether the address provided is known to be valid. If it is safe to execute the function, shown as the positive exit from 340, the body of the inconsistency-aware function may be executed without the need to validate the consistency of the read set of the atomic transaction to date, as in 345, and control may return to the atomic transaction, as in 380.

In the example illustrated in FIG. 3, if application of the error avoidance mechanism fails (e.g., a check on an address, bounds, or input parameter value indicates that execution of the function will result in a semantically illegal or otherwise undesirable operation), the inconsistency-aware function may set an error indicator, as in 365, and may return, as in 380. In the example, illustrated in FIG. 3, if no error avoidance mechanism is available (e.g., if there are no simple checks to determine if it is safe to execute the body of the function in the case that the read set values are mutually inconsistent), the inconsistency-aware function may resort to the invocation of a read set consistency validation operation, as in 350.

If the read set consistency is validated, the body of the inconsistency-aware function may be executed. This is shown as the positive exit from 360 and 370. At this point, control may return to the atomic transaction, as in 380. If the read set consistency is not validated (i.e., if it cannot be determined that the read set values are mutually consistent), shown as the negative exit from 360, an error indicator may be set and/or returned by the inconsistency-aware function to indicate that it is still not known whether the read set values are mutually consistent, as in 365 and 380. As noted in 370, in some embodiments, a read set consistency validation indicator (e.g., maintained in a register or other shared location) may be updated following a validation attempt, and may indicate to the atomic transaction code and/or to other inconsistency-aware functions that validation of read set consistency up to that point has been attempted and/or to indicate that the read set values have been shown to be mutually consistent up to that point, in different embodiments.

Note that while the example illustrated in FIG. 3 includes multiple alternative actions that may be performed by an inconsistency-aware function in response to an input parameter indicating that read set values are not known to be mutually consistent, in other embodiments, one or more of these operations may not be available, or may not be performed. For example, in one embodiment, the function may not include an operation to determine if the body of the function can be executed even when the read set values are inconsistent, as in 330, because it may always be safe to execute the body of the function with mutually inconsistent read set values. In another example, an error avoidance mechanism may be built into the body of the function and may always be executed when the function is called. In yet another example, it may never be safe to execute the body of the function with mutually inconsistent read set values, and the function may return (or set) an error indicator whenever it is called with a consistency parameter value of "false." Note also that in various embodiments, code for an inconsistency-aware function may include paths for two or more of the alternative actions illustrated in FIG. 3, but they may be executed in a different order. Note also that in some embodiments, a single shared indicator (rather than the error and read set consistency validation indicators described above) may be written to or returned by the atomic transaction upon the return from the inconsistency-aware function. For example, any condition that results in the execution of the body of the inconsistency-aware function may cause such an indicator to be set to "true" while any condition that results in the return from the function without executing its body may cause such an indicator to be set to "false."

Note that in the examples illustrated in FIGS. 2 and 3, execution of an atomic transaction may continue to completion even if inconsistencies are detected in its read set, as long as it is determined that executing the remaining instructions is "safe" (e.g., not semantically illegal or otherwise undesirable). In other embodiments, however, an atomic transaction may be aborted, rolled back, and/or retried as soon as any read set value inconsistency, or possible inconsistency, is detected (e.g., at 320 or 350 of FIG. 3). In the example illustrated in FIG. 3, if the body of the inconsistency-aware function cannot be safely executed due to mutually inconsistent values in the read set of the atomic transaction, the function may return without executing the body of the instruction, and may set an error indicator, which may be checked by the atomic transaction (as in 220 of FIG. 2).

Note that while several examples described herein include the passing of a consistency parameter to an inconsistency-aware library function, in other embodiments, a variable (e.g., a global consistency variable, read_setValid) may store a current indication of whether or not the read set values are known to be consistent and the compiler may output a functional sequence executable to test the variable to determine one of alternate execution paths, each of which calls a different inconsistency-aware function in the library. For example, in the example described earlier, an inconsistency-aware library included a single function having an argument "theValid", as shown below.

```
UINT8 HyTMCompilerIf_TranRead8 (void* theTranId,
    RdHandle* theRdHandle, UINT8 * theAddr, bool theValid);
```

In another embodiment, the library may include two functions, one of which is called if such a global consistency variable is "true" and the other of which is called if the global consistency variable is "false," as in the example below.

```
if (read_setValid)
    HyTMCompilerIf_TranRead8_Consistent (tranId,
        rdHandle, addr);
else
    HyTMCompilerIf_TranRead8_MaybeInconsistent (tranId,
        rdHandle, addr);
```

In this example, if the read set is known to be consistent, the library function called may not include an operation to validate the read set before or after performing a read operation. If, on the other hand, the read set is not known to be consistent, the library function called may attempt to validate the read set and/or may invoke an error avoidance mechanism, as described herein, and may only perform the read operation if it is safe to do so.

Figure 4:
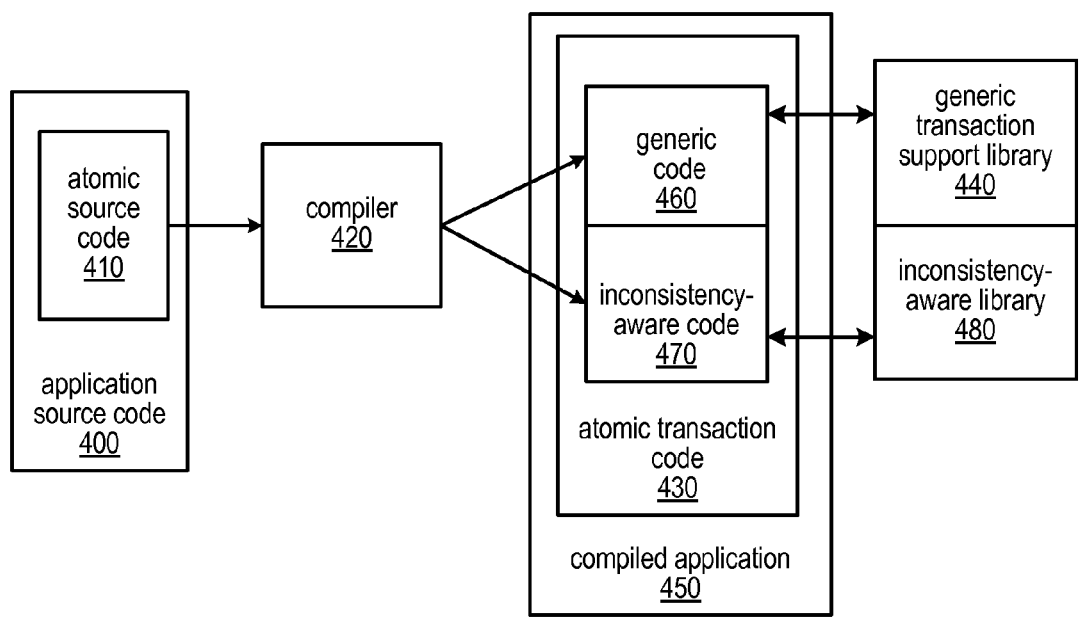
FIG. 4 is a block diagram illustrating an inconsistency-aware compiler generating application code, according to one embodiment.
Figure 5:
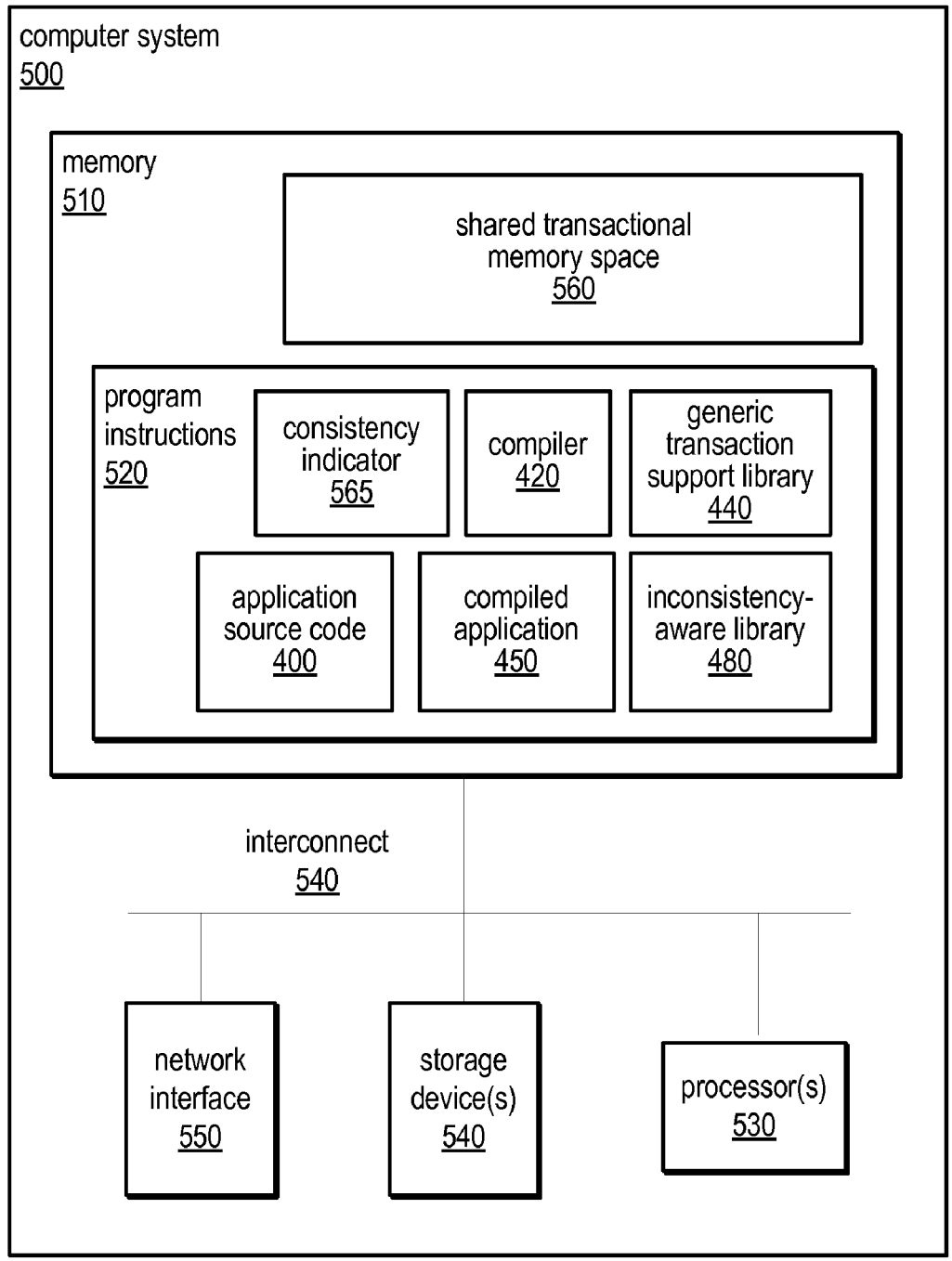
FIG. 5 is a block diagram illustrating an exemplary computer system configured to implement a software transactional memory that exploits an inconsistency-aware compiler and library interface, as described herein.

The system and methods described herein may in various embodiments employ an inconsistency-aware compiler and/or a library of one or more inconsistency-aware functions. FIG. 4 is a block diagram illustrating a compiler 420 configured to analyze application source code 400, and then generate atomic transaction code 430 as part of compiled application 450, as described above. As described above, an inconsistency-aware compiler, such as compiler 420 may in some embodiments be configured to replace programmer written code, such as in atomic source code 410, which is to be executed atomically with alternate code that includes calls to one or more inconsistency-aware functions. For example, a programmer may write the source code for an application, such as application source code 400, using atomic blocks to specify sets of instructions that should be executed atomically and/or as a transaction. For example, the program may include sets of instructions to be executed atomically together within a set of curly brackets (e.g., "{ }") preceded by the term "atomic", thus indicating that the instructions within the brackets should be executed atomically.

Compiler 420 may, during the compilation of application source code 400, identify one or more sets of instructions to be executed atomically, such as by recognizing the atomic keyword, in one embodiment. In other embodiments, a programmer may use other or additional manners to indicate sets of instructions to be executed atomically. For example, in some embodiments, operations to be executed atomically may be designated using pairs of keywords, such as transaction_begin and transaction_end, to specify the beginning and end, respectively, of a group of operations. Thus, compiler 420 may be configured to identify sets of instructions or other fragments or portions of an application (e.g., functions, objects, method, classes, etc) by recognizing any of various language constructs that may be used to designate those instructions, fragments or portions to be executed atomically. A programmer may also use a particular language construct, such as an atomic keyword, to designate specific data structures, classes and/or objects that should be accessed using transactions. Thus, in some embodiments, compiler 420 may be configured to recognize such atomic structures, class and/or objects and generate code to ensure that they are accessed using transactions.

Additionally, compiler 420 may, in one embodiment, be configured to generate or insert code configured to determine at runtime whether or not read set consistency validation should be performed at various points during execution of an atomic transaction. For example, compiler 420 may insert one or more inconsistency-aware function calls or may replace one or more generic function calls with corresponding inconsistency-aware function calls. The inconsistency-aware functions may be configured to test a certain condition (e.g., a consistency parameter value passed to the function or another consistency parameter stored elsewhere in the system) at runtime to determine whether or not a particular set of instructions should be executed (e.g., instructions configured to implement a read set validation operation or to perform other error avoidance operation).

While described herein mainly in terms of a compiler, compiler 420 may also represent other entities configured to generate atomic transaction code 430, according to different embodiments. For instance, in one embodiment, compiler 420 may represent a code optimizer rather than a compiler. In another embodiment, compiler 420 may represent a just-in-time (JIT) compiler. In some embodiments, compiler 420 may represent an assembler rather than a compiler. In general, compiler 420 may represent any entity capable of and configured to generate atomic transaction code for implementing transaction methods, as described herein. While described herein as various software entities, compiler 420 may, in some embodiments, represent a hardware-based entity configured to generate atomic transaction code for implementing transaction methods.

Application source code 400 and/or atomic source code 410 may represent program instructions in any of various languages, according to various embodiments. For example, in some embodiments, atomic source code 410 may represent code written in a high level programming language, such as C, C++, or Java™. In other embodiments, atomic source code 410 may represent binary instructions or assembly instructions. In yet other embodiments, atomic source code 410 may also represent compiler-intermediate instructions or virtual machine byte code instructions, such as Java™ byte code instructions.

As illustrated in FIG. 4, atomic transaction code 430 may represent the code generated by compiler 420 and may include both generic code 460 and inconsistency-aware code 470. While shown in FIG. 4 as separate entities, generic code 460 and inconsistency-aware code 470 may be included within atomic transaction code 430 in any combination or arrangement of both types of instructions (e.g., with various generic instructions and inconsistency-aware functions interleaved throughout atomic transaction code 430), in various embodiments.

As illustrated in FIG. 4, atomic transaction code 430 may be configured to utilize and/or include one or more libraries of transaction enabling code, such as generic transaction support library 440 and/or inconsistency-aware library 480. In various embodiments, generic code 460 and/or transaction support library 440 may include functionality to execute transactions according to various software transactional memory techniques. For example, in some embodiments, generic code 460 may include the functionality to begin and end transactions according to various software transactional memory techniques. In another example, generic code 460 may make calls into the generic transaction support library 440 for beginning and committing software transactions, and for each memory access for which read set consistency is known to be valid or for which validation of read set consistency has been determined to be unnecessary. Additional functionality, such as the ability to support self-abort and nesting in transactions, may be provided by functions of generic transaction support library 440, in some embodiments.

Inconsistency-aware library 480 may include inconsistency-aware functions configured to determine if read set consistency validation should be performed and/or to invoke such validation, as described herein. In the example illustrated in FIG. 4, compiler 420 may be configured to generate atomic transaction code 430 that includes inconsistency-aware code 470 configured to call functions provided by inconsistency aware library 480 and/or generic code 460 configured to call functions provided by generic transaction support library 440. As previously noted, in other embodiments, both inconsistency-aware functions and generic functions may be included in a single transaction support library, rather than in separate libraries.

In some embodiments, programmers may write transaction code once using familiar coding styles, but the transaction may be effected according to particular software transactional memory implementation techniques. The transaction code written by the programmer may be translated, replaced or transformed (e.g., by compiler 420) into a code that is configured to implement transactions according to one or more of various software transactional memory techniques supported by the execution environment (e.g., the operating system and/or underlying memory subsystem hardware).

While the description herein is focused primarily on the application of inconsistency-aware compilers, inconsistency-aware library functions, and corresponding compiler-library interfaces to software transactional memory (STM) implementations, persons skilled in the art may appreciate that these systems and methods may be more generally applicable to various other transactional memory techniques and implementations, such as Hybrid Transactional Memory (HyTM) and Phased Transactional Memory (PhTM). Hybrid Transactional Memory (HyTM) implementations allow transactions to be executed using hardware transactional memory if it is available and when it is effective, or using software transactional memory otherwise. Hybrid transactional memory techniques are described in U.S. Pat. No. 7,395,382, entitled "Hybrid Software/Hardware Transactional Memory," and naming Mark S. Moir as inventor. In a phased transactional memory (PhTM) implementation, transactions may be executed using different transactional memory implementations at different times in the same application, without a requirement that they be compatible with transactions executed in different modes. Phased transactional memory techniques are described in co-pending U.S. patent application Ser. No. 11/967,371, entitled "System and Method for Supporting Phased Transactional Memory Modes," and naming Daniel S. Nussbaum and Mark S. Moir as inventors.

FIG. 4 illustrates a computing system configured to implement inconsistency-aware compiler and library based support for software transactions, as described herein and according to various embodiments. Computer system 500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 500 may include a processor unit 530 (possibly including multiple processors, a single-threaded processor, a multi-threaded processor, a multi-core processor, etc.). The computer system 500 may also include one or more system memories 510 (e.g., one or more of cache, SRAM DRAM, RDRAM, EDO RAM, DDR RAM, SDRAM, Rambus RAM, EEPROM, etc.), a system interconnect 540 (e.g., LDT, PCI, ISA, etc.), a network interface 550 (e.g., an ATM interface, an Ethernet interface, a Frame Relay interface, etc.), and one or more storage device(s) 540 (e.g., optical storage, magnetic storage, etc.). The memory medium may include other types of memory as well, or combinations thereof. Embodiments of the invention may include fewer or additional components not illustrated in FIG. 4 (e.g., video cards, audio cards, additional network interfaces, peripheral devices, etc.). The processor unit 530, the storage device(s) 540, the network interface 550, and the system memory 510 are coupled to the system interconnect 540. One or more of the system memories 510 may embody a compiler configured to provide executable functional sequences for implementing atomic transactions. Additionally, one or more of the system memories 510 may embody an application including code specifying one or more atomic transactions.

In some embodiments, memory 510 may include program instructions 520 configured to implement a compiler, such as compiler 420, configured to generate executable code that includes atomic transactions and that includes calls to inconsistency-aware functions, as described herein. Additionally, program instructions 520 may comprise application source code 400 including code configured to request or specify atomic transactions, as well as compiled application 450, as described herein. Program instructions 520 may also be configured to implement a generic transaction support library 440, configured to provide various methods for implementing atomic transactions, as described herein. Program instructions 520 may also be configured to implement an inconsistency-aware library 480, configured to provide various inconsistency-aware methods for use in atomic transactions, as described herein.

As illustrated in FIG. 4, program instructions 520 may in some embodiments include one or more storage locations configured to store values of one or more indicators, such as consistency indicator 565. Compiler 420, application source code 400, compiled application 450, inconsistency-aware library 480, and/or generic transaction support library 440 may each be implemented in any of various programming languages or methods. For example, in one embodiment, compiler 420, inconsistency-aware library 480, and generic transaction support library 440 may be JAVA based, while in another embodiments, they may be written using the C or C++ programming languages. Similarly, application source code 400 may be written using Java, C, C++, or another programming language, according to various embodiments. Moreover, in some embodiments, compiler 420, inconsistency-aware library 480, generic transaction support library 440, and application 410 may not be implemented using the same programming language. For example, application source code 400 may be C++ based, while compiler 420 may be developed using C.

As illustrated in FIG. 4, memory 510 may also include a shared transactional memory space 560, which may support and/or be accessed using STM, HTM, and/or HyTM transactions, in different embodiments. In some embodiments, one or more storage locations for the values of various fields of an indicator variable, such as consistency indicator 565, may be included in shared memory space 560.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method, comprising:
preparing an executable functional sequence corresponding to a source representation of code comprising an atomic transaction;
wherein said preparing comprises:
including in the functional sequence a call to an inconsistency-aware function, wherein the inconsistency-aware function is called by code within the atomic transaction, wherein actions taken by the inconsistency-aware function are dependent on whether read set values for the atomic transaction are known to be consistent with each other at the point of the call to the inconsistency-aware function and prior to its execution, and wherein the read set values are values read by read access operations within the atomic transaction.

2. The method of claim 1,
wherein the call to the inconsistency-aware function comprises a consistency parameter value indicative of whether the read set values for the atomic transaction are known to be consistent with each other.

3. The method of claim 1, further comprising:
executing the functional sequence; and
executing the inconsistency-aware function;
wherein said executing the functional sequence comprises determining, prior to invoking the inconsistency-aware function, whether the read set values are known to be consistent with each other; and
wherein in response to determining that the read set values are known to be consistent with each other, said executing the inconsistency-aware function comprises executing the body of the inconsistency-aware function without performing an operation to validate the consistency of the read set values.

4. The method of claim 1, further comprising:
executing the functional sequence; and
executing the inconsistency-aware function;
wherein said executing the functional sequence comprises determining, prior to invoking the inconsistency-aware function, whether the read set values are known to be consistent with each other; and
wherein in response to determining that the read set values are not known to be consistent with each other, said executing the inconsistency-aware function comprises initiating execution of a read set consistency validation operation.

5. The method of claim 4, wherein said executing the inconsistency-aware function further comprises:
in response to validating that the read set values are consistent with each other:
executing the body of the inconsistency-aware function; and
providing an indication that consistency of the read set values has been validated;
wherein said executing the functional sequence comprises, subsequent to said executing the inconsistency-aware function, executing a second inconsistency-aware function; and wherein actions taken by the second inconsistency-aware function are dependent, at least in part, on the indication that consistency of the read set values has been validated.

6. The method of claim 4, wherein said executing the inconsistency-aware function further comprises:
in response to a failure to validate that the read set values are consistent with each other, returning without executing the body of the inconsistency-aware function.

7. The method of claim 1, further comprising:
executing the functional sequence; and
executing the inconsistency-aware function;
wherein said executing the functional sequence comprises determining, prior to invoking the inconsistency-aware function, whether the read set values are known to be consistent with each other; and
wherein in response to determining that the read set values are not known to be consistent with each other, said executing the inconsistency-aware function comprises executing the body of the inconsistency-aware function without performing an operation to validate the consistency of the read set values if it is safe to execute the body of the inconsistency-aware function with inconsistent read set values.

8. The method of claim 1, further comprising:
executing the functional sequence; and
executing the inconsistency-aware function;
wherein said executing the functional sequence comprises determining, prior to invoking the inconsistency-aware function, whether the read set values are known to be consistent with each other; and
wherein in response to determining that the read set values are not known to be consistent with each other, said executing the inconsistency-aware function comprises executing the inconsistency-aware function in accordance with an error avoidance operation.

9. The method of claim 1, further comprising:
executing the functional sequence; and
executing the inconsistency-aware function;
wherein said executing the functional sequence comprises determining, prior to invoking the inconsistency-aware function, whether the read set values are known to be consistent with each other; and
wherein in response to determining that the read set values are not known to be consistent with each other, said executing the inconsistency-aware function comprises:
invoking an operation to determine whether it is safe to execute the body of the inconsistency-aware function using input parameter values passed to the inconsistency-aware function; and
executing the body of the inconsistency-aware function if and only if it is determined to be safe to execute the body of the inconsistency-aware function using the input parameter values passed to the inconsistency-aware function.

10. The method of claim 1, wherein said including is performed in response to determining that the read set of the atomic transaction cannot be guaranteed to be consistent at the point of the call to the inconsistency-aware function.

11. A system, comprising:
one or more processors; and
a memory coupled to the one or more processors and comprising program instructions executable by the one or more processors to implement an inconsistency-aware compiler;
wherein the inconsistency-aware compiler is configured to prepare an executable functional sequence corresponding to a source representation of code comprising an atomic transaction;
wherein said preparing comprises:
including in the functional sequence a call to an inconsistency-aware function, wherein the inconsistency-aware function is called by code within the atomic transaction, wherein actions taken by the inconsistency-aware function are dependent on whether read set values for the atomic transaction are known to be consistent with each other at the point of the call to the inconsistency-aware function and prior to its execution, and wherein the read set values are values read by read access operations within the atomic transaction.

12. The system of claim 11,
wherein the call to the inconsistency-aware function comprises a consistency parameter value indicative of whether the read set values for the atomic transaction are known to be consistent with each other.

13. The system of claim 11,
wherein the functional sequence is executable to implement: determining, prior to invoking the inconsistency-aware function, whether the read set values are known to be consistent with each other; and
wherein the inconsistency-aware function is executable to implement: in response to determining that the read set values are known to be consistent with each other, executing the body of the inconsistency-aware function without performing an operation to validate the consistency of the read set values.

14. The system of claim 11,
wherein the functional sequence is executable to implement: determining, prior to invoking the inconsistency-aware function, whether the read set values are known to be consistent with each other; and
wherein the inconsistency-aware function is executable to implement, in response to determining that the read set values are not known to be consistent with each other, one or more of:
initiating execution of a read set consistency validation operation to attempt to determine whether the read set values are consistent with each other;
executing the body of the inconsistency-aware function in response to determining that the read set values are consistent with each other;
initiating execution of an operation to determine whether it is safe to execute the body of the inconsistency-aware function using input parameter values passed to the inconsistency-aware function;
executing the body of the inconsistency-aware function in response to determining that it is safe to execute the body of the inconsistency-aware function using the input parameter values passed to the inconsistency-aware function;
executing the body of the inconsistency-aware function without performing an operation to validate the consistency of the read set values if it is safe to execute the body of the inconsistency-aware function with inconsistent read set values; and
returning without executing the body of the inconsistency-aware function.

15. The system of claim 11, wherein said including is performed in response to determining that the read set of the atomic transaction cannot be guaranteed to be consistent at the point of the call to the inconsistency-aware function.

16. A computer-readable storage medium storing program instructions computer-executable to implement:
   preparing an executable functional sequence corresponding to a source representation of code comprising an atomic transaction;
   wherein said preparing comprises:
      including in the functional sequence a call to an inconsistency-aware function, wherein the inconsistency-aware function is called by code within the atomic transaction, wherein actions taken by the inconsistency-aware function are dependent on whether read set values for the atomic transaction are known to be consistent with each other at the point of the call to the inconsistency-aware function and prior to its execution, and wherein the read set values are values read by read access operations within the atomic transaction.

17. The storage medium of claim 16,
   wherein the call to the inconsistency-aware function comprises a consistency parameter value indicative of whether the read set values for the atomic transaction are known to be consistent with each other.

18. The storage medium of claim 17,
   wherein the program instructions are further executable to implement the functional sequence and the inconsistency-aware function;
   wherein the functional sequence is executable to implement: determining, prior to invoking the inconsistency-aware function, whether the read set values are known to be consistent with each other; and
   wherein the inconsistency-aware function is executable to implement: in response to determining that the read set values are known to be consistent with each other, executing the body of the inconsistency-aware function without performing an operation to validate the consistency of the read set values.

19. The storage medium of claim 17,
   wherein the program instructions are further executable to implement the functional sequence and the inconsistency-aware function;
   wherein the functional sequence is executable to implement: determining, prior to invoking the inconsistency-aware function, whether the read set values are known to be consistent with each other; and
   wherein the inconsistency-aware function is executable to implement, in response to determining that the read set values are not known to be consistent with each other, one or more of:
      initiating execution of a read set consistency validation operation to attempt to determine whether the read set values are consistent with each other;
      executing the body of the inconsistency-aware function in response to determining that the read set values are consistent with each other;
      initiating execution of an operation to determine whether it is safe to execute the body of the inconsistency-aware function using input parameter values passed to the inconsistency-aware function;
      executing the body of the inconsistency-aware function in response to determining that it is safe to execute the body of the inconsistency-aware function using the input parameter values passed to the inconsistency-aware function;
      executing the body of the inconsistency-aware function without performing an operation to validate the consistency of the read set values if it is safe to execute the body of the inconsistency-aware function with inconsistent read set values; and
      returning without executing the body of the inconsistency-aware function.

20. The storage medium of claim 16, wherein said including is performed in response to determining that the read set of the atomic transaction cannot be guaranteed to be consistent at the point of the call to the inconsistency-aware function.

* * * * *